United States Patent
Romoser

(10) Patent No.: US 12,471,530 B2
(45) Date of Patent: Nov. 18, 2025

(54) VARIABLE SPEED STALK ROLL UNIT

(71) Applicant: CNH Industrial America LLC, New Holland, PA (US)

(72) Inventor: Tyler Romoser, Keota, IA (US)

(73) Assignee: CNH Industrial America LLC, New Holland, PA (US)

( * ) Notice: Subject to any disclaimer, the term of this patent is extended or adjusted under 35 U.S.C. 154(b) by 710 days.

(21) Appl. No.: 17/877,014

(22) Filed: Jul. 29, 2022

(65) Prior Publication Data

US 2024/0032471 A1 Feb. 1, 2024

(51) Int. Cl.
*A01D 45/02* (2006.01)

(52) U.S. Cl.
CPC .................... *A01D 45/025* (2013.01)

(58) Field of Classification Search
CPC .. A01D 45/025; A01D 41/141; A01D 41/142; A01D 45/02; A01D 41/00
USPC ............ 701/50, 31.2; 56/104, 109, 110, 105
See application file for complete search history.

(56) References Cited

U.S. PATENT DOCUMENTS

| | | | | |
|---|---|---|---|---|
| 3,304,702 A * | 2/1967 | Russell | ................ | A01D 45/025 56/104 |
| 5,359,836 A * | 11/1994 | Zeuner | ................ | A01D 41/141 56/208 |
| 6,116,005 A * | 9/2000 | Chamberlain | ....... | A01D 45/021 56/106 |
| 6,167,685 B1 * | 1/2001 | Berger | ................ | A01D 34/006 56/10.2 G |
| 8,321,093 B2 * | 11/2012 | Pollklas | ............... | A01D 41/127 701/31.2 |
| 8,534,036 B2 | 9/2013 | Zegota et al. | | |
| 8,646,250 B2 | 2/2014 | Lohrentz et al. | | |
| 9,198,351 B2 | 12/2015 | Tilly et al. | | |
| 9,578,804 B2 | 2/2017 | Gessel et al. | | |
| 10,039,232 B2 | 8/2018 | Calmer | | |
| 11,910,744 B2 * | 2/2024 | Gramm | ................ | A01D 45/025 |
| 2011/0041472 A1 * | 2/2011 | Rottinghaus | ......... | A01D 45/021 56/119 |
| 2016/0338268 A1 | 11/2016 | Calmer | | |
| 2018/0255706 A1 * | 9/2018 | Smith | .................... | A01D 41/14 |
| 2019/0174675 A1 | 6/2019 | Gramm et al. | | |
| 2021/0378174 A1 | 12/2021 | Gramm et al. | | |

FOREIGN PATENT DOCUMENTS

DE 10 2012 020 994 A1 4/2014
EP 1417877 B1 * 11/2009 ........... A01D 45/025

OTHER PUBLICATIONS

Extended European Search Report for EP Application No. 23188367.9 dated Jan. 5, 2024 (six pages).

* cited by examiner

*Primary Examiner* — Joseph M Rocca
*Assistant Examiner* — Sunny D Webb
(74) *Attorney, Agent, or Firm* — CM Law PLLC; Stephen J. Weed

(57) ABSTRACT

An agricultural harvester having stalk rolls with different angular velocities to provide greater control over axial splitting and shredding of corn stalks. Angular velocities for a pair of stalk rolls are controlled through the use of a driveline coupled to the engine for rotating one of the stalk rolls and an electrical motor for rotating the other stalk roll.

12 Claims, 5 Drawing Sheets

VARIABLE SPEED STALK ROLL UNIT

FIELD OF THE INVENTION

The present invention pertains to an agricultural harvester, and, more specifically, to a combine header.

BACKGROUND OF THE INVENTION

An agricultural harvester known as a "combine" is historically termed such because it combines multiple harvesting functions with a single harvesting unit, such as picking, threshing, separating, and cleaning. A combine includes a header (which can also be referred to as a head) which removes the crop from a field, and a feeder housing which transports the crop matter into a threshing rotor (or threshing cylinder). The threshing rotor rotates within a perforated housing, which may be in the form of adjustable concaves, and performs a threshing operation on the crop to remove the grain. Once the grain is threshed it falls through perforations in the concaves onto a grain pan (or an auger bed). From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent to a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Headers of combines can be used to harvest various types of crop material, such as corn. Such headers can include a plurality of row units each of which receives a respective corn stalk. A respective row unit can include two gathering chains each including paddles, two deck plates (which can also be referred to as stripper plates) which are spaced apart from one another to form a gap therebetween, and two rotating stalk rolls. The gap between the deck plates receives the corn stalk, and as the corn stalk is pulled down between the deck plates by the stalk rolls ears attached to the stalk can strike the deck plates and thereby be stripped from the stalk and be moved onward toward the interior of the combine by the paddles of the gathering chains.

Today's corn genetics have led to an increased need for some form of mechanical processing by the corn header to help facilitate and accelerate the breakdown of the corn stalk, prior to next season's planting operation. Likewise, today's corn headers have varying capabilities and methods of stalk processing. An optimum corn residue condition can be one where a pith of the corn stalk is completely exposed, while the optimum size for processed corn stalks can be determined depending upon the situation and grower preferences (for example and not by way of limitation, this may be between three to seven inches). An optimum condition and size range allows for accelerated plant breakdown, but does not allow for the processed corns stalks to be easily transported by wind or water erosion. Many chopping corn headers today either are not designed to split the corn stalk axially, or they create "confetti like" pieces that are highly subject to erosion and are not easily swept aside by the trash wheels during a subsequent planting operation. Further, the stalk rolls of a respective row unit are known to have a set gear ratio and to rotate at the same speed in relation to each other.

What is needed in the art is an improved way to process corn stalks by the stalk rolls of a row unit.

SUMMARY OF THE INVENTION

The present invention provides stalk rolls of a respective row unit of a corn header which can be controllably rotated at angular velocities which are different from and variable relative to one another.

The invention in one form is directed to an agricultural harvester, including: a harvester frame; an agricultural header coupled with the harvester frame, the agricultural header including: a header frame; at least one row unit including a first stalk roll and a second stalk roll, the first stalk roll configured for rotating at a first angular velocity, the second stalk roll configured for rotating at a second angular velocity which is different from and variable relative to the first angular velocity.

The invention in another form is directed to an agricultural header of an agricultural harvester, the agricultural header including a harvester frame, the agricultural harvester being coupled with the harvester frame, the agricultural header including: a header frame; at least one row unit including a first stalk roll and a second stalk roll, the first stalk roll configured for rotating at a first angular velocity, the second stalk roll configured for rotating at a second angular velocity which is different from and variable relative to the first angular velocity.

The invention in yet another form is directed to a method of using an agricultural harvester, the method including the steps of: providing that the agricultural harvester includes a harvester frame and an agricultural header coupled with the harvester frame, the agricultural header including a header frame and at least one row unit including a first stalk roll and a second stalk roll; rotating the first stalk roll at a first angular velocity; and rotating the second stalk roll at a second angular velocity which is different from and variable relative to the first angular velocity.

An advantage of the present invention is that it provides a way to rotate the stalk rolls of a respective row unit at different angular velocities relative to one another.

Another advantage of the present invention is that it provides a way to vary the angular velocities of the of the stalk rolls of the respective row unit by way of a respective driveline.

Yet another advantage of the present invention is that, by having the stalk rolls of the corn header row unit rotating at differential/variable speeds, the incoming stalk material can be pulled, split, and shredded axially as opposed to perpendicular processing that takes place with conventional stalk rolls and stalk chopper designs. Having a variable speed ratio between both stalk rolls, allows for varying levels of shredding to occur, depending on the customer preferences and/or plant characteristics. The ability to vary the amount of chopping and stalk processing by the stalk rolls can reduce the weight of the corn header and provide cost savings.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG (Material Other than Grain), or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
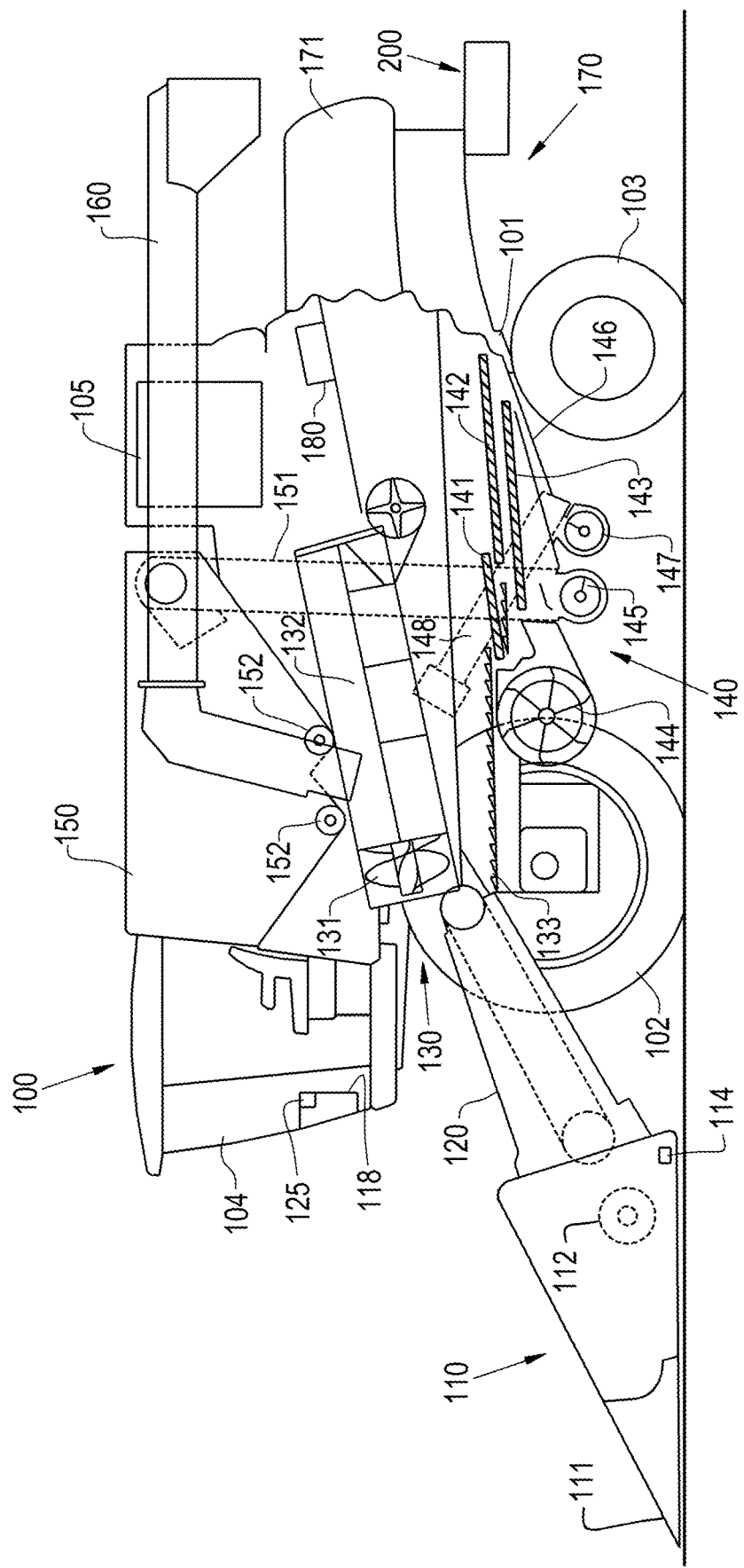
FIG. 1 illustrates a side view of an exemplary embodiment of an agricultural harvester, the agricultural harvester including a header assembly and a control system, in accordance with an exemplary embodiment of the present invention.

Referring now to the drawings, and more particularly to FIG. 1, there is shown an embodiment of an agricultural harvester 100 in the form of a combine which generally includes a chassis 101 (which can be referred to as a harvester frame 101), ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks. Further, combine 100 includes a control system 118, in whole or in part, operatively coupled with harvester frame 101 and header frame 114. Control system 118 can further include an input/output device 125 such as a laptop computer (with keyboard and display), a touchpad (including keypad functionality and a display), and/or one or more switches, device 125 being configured for a user to interface therewith. Device 125 can be located in any suitable location, such as mounted in cab 104 (as indicated in FIG. 1), or remotely from combine 100. Further, device 125 can be a plurality of devices spaced apart from one another.

Header 110 (which can be referred to as a header assembly or an agricultural header) is mounted to the front of combine 100 and, in this example, is a corn header 110 (which can also be referred to as a corn head or a corn assembly). Header 110 is coupled with harvester frame 101. Header 110 includes header frame 114 (shown schematically in FIG. 1) coupled with frame 101, a plurality of dividers 111 (which can be referred to as snouts 111) coupled with header frame 114 and spaced apart across the front of header 110 (the left-most divider 111 being shown in FIG. 1), and a plurality of row units 206 (FIG. 2) coupled with the header frame 114, each row unit 206 being generally operatively positioned between two respective dividers 111. Row units 206 separate the ear of corn from respective stalks in a field during forward motion of combine 100 and move the ears to an auger 112, such as a double auger 112, which feeds the severed crop (here, an ear of corn) laterally inwardly from each side toward feeder housing 120 (it can be appreciated that other types of conveyors can be used besides double auger 112, such as a draper header). Feeder housing 120 conveys the severed crop to threshing and separating system 130, and is selectively vertically movable using appropriate actuators, such as hydraulic cylinders (not shown). The header of the present invention can be flexible, rigid, and/or articulating.

Threshing and separating system 130 is of the axial-flow type, and generally includes a threshing rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue management system 170 of combine 100. Optionally, the chaff and/or straw can proceed through a chopper 180 to be further processed into even smaller particles before discharge out of the combine 100 by a spreader assembly 200. It should be appreciated that the "chopper" 180 referenced herein, which may include knives, may also be what is typically referred to as a "beater", which may include flails, or other construction and that the term "chopper" as used herein with respect to 180 refers to any construction which can reduce the particle size of entering crop material by various actions including chopping, flailing, etc. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

Figure 2:
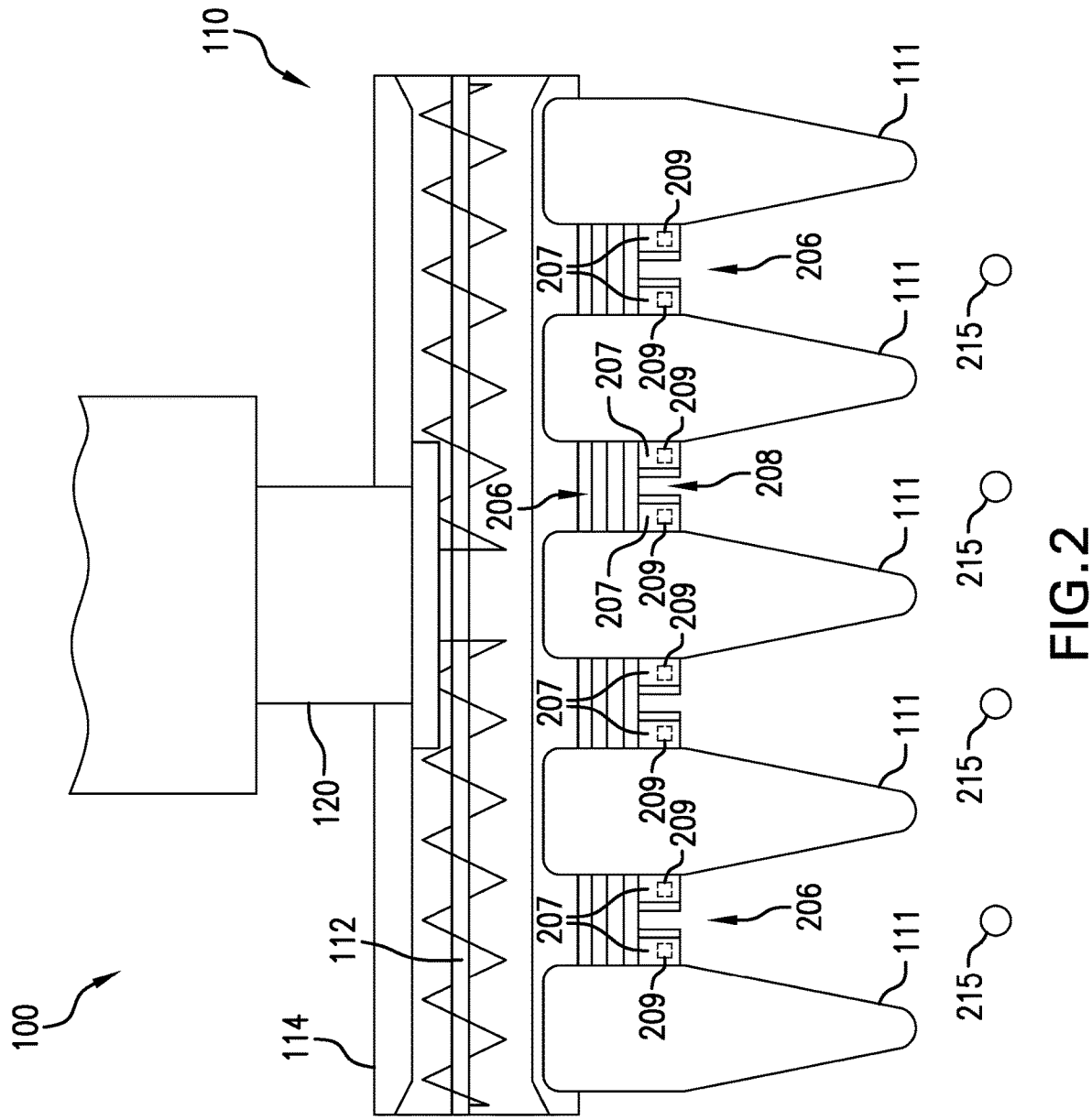
FIG. 2 illustrates a top view of the agricultural harvester of FIG. 1, with portions broken away, showing, more particularly, the header assembly including a plurality of row units, in accordance with an exemplary embodiment of the present invention.

Referring now to FIG. 2, there is shown schematically a top view of combine 100 with header 110, with portions broken away. Header 110 includes frame 114 and dividers 111 coupled therewith; it can be appreciated that header 110 can include any suitable number of dividers 111, such as more or less than what is shown in FIG. 2. Each row unit 206 includes two gathering chains each including paddles (not shown), two deck plates 207 (which can also be referred to as stripper plates 207) which are spaced apart from one another to form a gap 208 therebetween, and two rotating stalk rolls 209 (stalk rolls 209 are shown schematically in FIG. 2 and are in broken lines in FIG. 2, considering that stalk rolls 209 are positioned generally under deck plates 207, though still positioned so as to be able to grab corn stalks 215, as is known). Each row unit 206 receives crop material 215, which is formed as respective ones of the corn stalks 215. More specifically, gap 208 between deck plates 207 receives the corn stalk 215, and as the corn stalk 215 is pulled down between deck plates 207 by stalk rolls 209 ears attached to the stalk strike deck plates 207 and are thereby stripped from the stalk 215 by deck plates 207 and are then moved onward toward the interior of combine 100 by the paddles of the gathering chains. Further, stalk rolls 209 chop the stalk 215, the chopped up stalk 215 at least eventually being deposited onto the ground. This chopping of the stalk 215 cuts the stalk 215 laterally (transverse to a longitudinal extent of the stalk 215), leaving stalk segments of about three to seven inches in length, and further, in accordance with the present invention, splits the stalk 215 axially (that is, longitudinally), thereby exposing the pith of the stalk 215, resulting in enhanced breakdown in the field.

Figure 3:
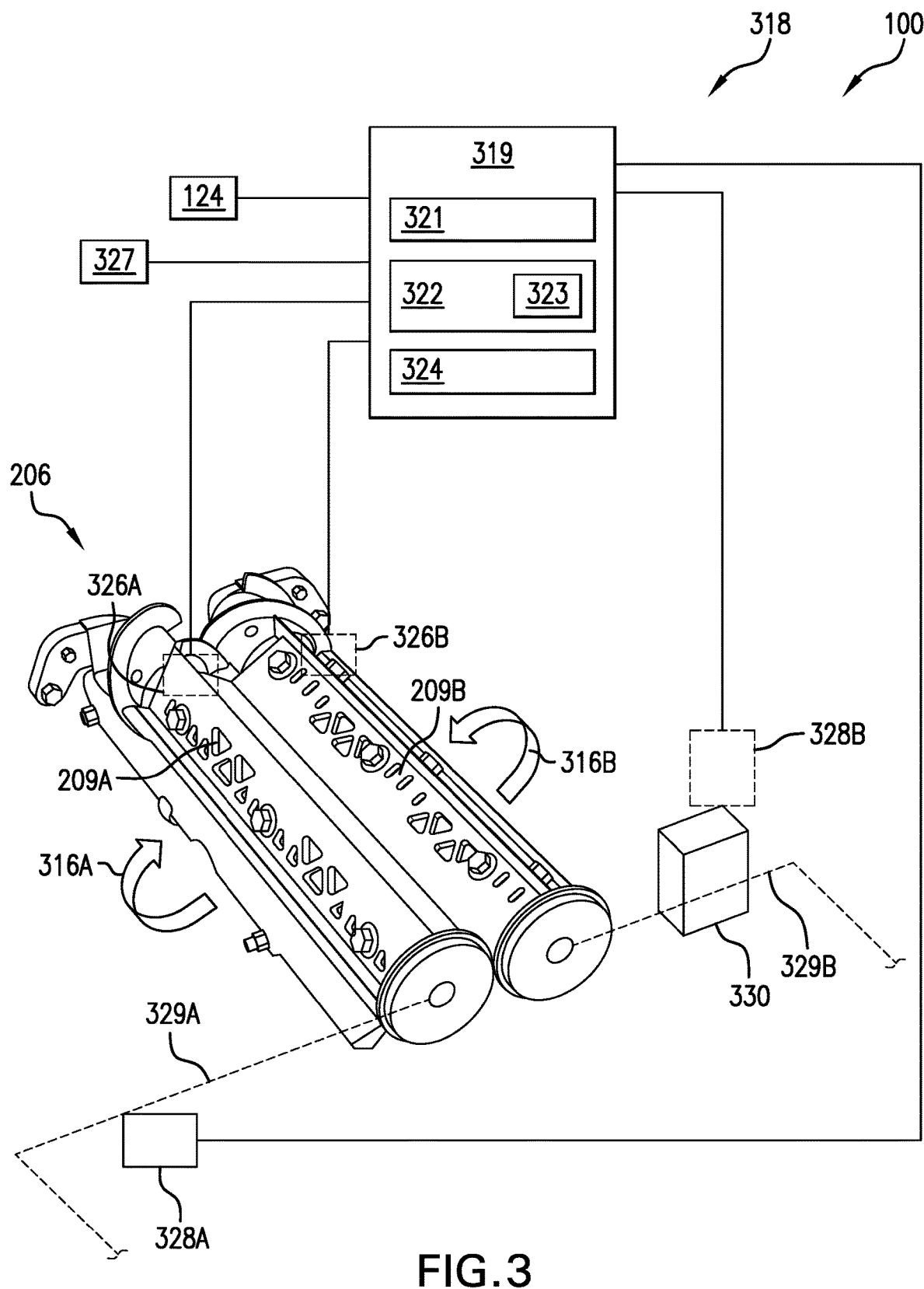
FIG. 3 illustrates a perspective view of the agricultural harvester of FIG. 1, with portions broken away, including two drivelines and the control system of FIG. 1 (shown schematically in side view), in accordance with an exemplary embodiment of the present invention.

Referring now to FIG. 3, there is shown schematically a perspective view of harvester 100, with portions broken away. More specifically, shown are two stalk rolls 209 of a respective row unit 206 (the rear of stalk rolls 209 being in the foreground of FIG. 3), now labeled more specifically as first stalk roll 209A and second stalk roll 209B, which are configured for rotating in directions opposite one another, with stalk roll 209A rotating in direction 316A and stalk roll 209B rotating in direction 316B; as is known, stalks 215 are captured between rotating stalk rolls 209A, 209B as stalk rolls 209A, 209 rotate in directions 316A, 316B, respectively. Stalk roll 209A and stalk roll 209B are configured for rotating at first and second angular velocities, respectively, wherein the second angular velocity (of second stalk roll 209B) can be different from and be variable relative to first angular velocity (of first stalk roll 209A), in accordance with the present invention. In this way, stalk rolls 209A, 209B are configured for rotating independently of one another, as explained more fully below.

According to an exemplary embodiment of the present invention, header 110 (and thus also harvester 100) includes separate drivelines 329A, 329B. That is, whereas each driveline 329A, 329B receives at least part of its mechanical power from an engine of harvester 100 (harvester 100 also including a transmission—shortly downstream of the engine—that affects one or both drivelines 329A, 329B), each driveline 329A, 329B can branch off from a single power take-off (PTO) shaft running from a main body of harvester 100 (the main body being that portion of harvester 100 that does not include header 110 but does include, for example, frame 101 and cab 104) to header 110; branching off from the PTO shaft in a downstream direction, optionally one driveline 329A, 329B can extend to a left side of header 110, and the other driveline 329A, 329B can extend to the right side of header 110. In this way, drivelines 329A, 329B can provide, separately and independently of one another, mechanical power to stalk rolls 209A, 209B, respectively, in order to rotate stalk rolls 329A, 329B with first and second angular velocities, respectively. Thus, driveline 329A is associated with stalk roll 209A, and driveline 329B is associated with stalk roll 209B. Each driveline 329A, 329B can serve a corresponding stalk roll 209A, 209B of each row unit 206; in other words, driveline 329A, for example, can provide mechanical power to each stalk roll 209A of each row unit 206, and driveline 329B can provide mechanical power to each stalk roll 209B of each row unit 206. By having separate drivelines, the differential and variation in angular velocity (which can also be referred to as rotational speed) between stalk rolls 209A, 209B of a respective row unit 206 can be generated. To achieve this difference and variability in angular velocities of stalk rolls 209A, 209B, stalk roll 209A can rotate at a constant angular velocity (by way of driveline 329A), and stalk roll 209B can rotate at an angular velocity (by way of driveline 329B) that is different from and variable relative to the angular velocity of stalk roll 209B. Having stalk rolls 209A, 209B of the corn head row unit 206 rotating at different angular velocities (speeds), the respective row unit 206 can still pull the stalk 215 downward, allowing deck plates 207 to remove the ear, while the rotating stalk rolls 209A, 209B pull, split, and shred the corn stalk 215. Opening the corn stalk 215 axially or lengthwise, exposes more of the pith and lignin to the environment, greatly accelerating microbial activity and plant decomposition. The ability to vary the rotational speed difference between stalk rolls 209A, 209B adds a level of adaptability for the operator and harvesting conditions. As an example, a 1:1 ratio of stalk roll angular velocity provides a conventional amount of stalk processing, while a 2:1 ratio of stalk roll angular velocity can provide a greater amount of axial splitting and shredding of the corn stalk 215.

More specifically, to achieve this difference and variation in angular velocities, stalk roll 209A can rotate at a predetermined angular velocity that is constant, and stalk roll 209B can rotate at a predetermined angular velocity that is constant but can also be different from and vary relative to the angular velocity of stalk roll 209A. Regarding stalk roll 209A, stalk roll 209A rotates at a constant set speed (set by operator by way of device 125, for example), governed by a fixed driveline 329A on header 110 and the harvester 100 input speed to header 110. That is, stalk roll 209A rotates at a constant angular velocity; however, because this angular velocity can be set by operator, operator can reset this angular velocity of stalk roll 209A, raising or lowering the angular velocity to a different constant angular velocity. This changing of the angular velocity of stalk roll 209A can be accomplished by any suitable device, such as a gearbox associated with driveline 329A (for example, one gearbox per stalk roll 209A, per groups of stalk rolls 209A, or for all stalk rolls 209A per header 110); such a device can be actuated by actuator 328A. By contrast, the angular velocity of stalk roll 209B can be varied with reference to the angular velocity of stalk roll 209A, in order to achieve desirable angular velocity ratio between stalk rolls 209A, 209B and thereby to achieve the desired quality of processing of stalks 215. Thus, stalk roll 209B can rotate at a constant set angular velocity (speed), but this constant angular velocity is both independent of and variable relative to the angular velocity of stalk roll 209A. The angular velocity variation of stalk roll 209B can be accomplished by way of driveline 329B equipped with and thus including a driveline device 330 configured for varying the angular velocity of stalk roll 209B. Thus, harvester 100 includes driveline device 330; more specifically, according to an exemplary embodiment of the present invention, header 110 includes driveline device 330. Driveline device 330 (which can be actuated by actuator 328B) can be any suitable device, for example, a continuously variable transmission (CVT), a hydraulic transmission, or the like. For the sake of discussion herein, driveline device 330 is assumed to be CVT 330. Driveline 329B optionally includes a single CVT 330, the single CVT 330 affecting each stalk roll 209B; alternatively, each stalk roll 209B can be assigned a different CVT 330, or a group of stalk rolls 209B less than all stalk rolls 209B can be assigned a respective CVT 330 which is different from the other group(s) of stalk rolls 209B. Thus, using the angular velocity of stalk roll 209A as a reference, CVT 330 can vary the angular velocity of stalk roll 209B to achieve the desired angular velocity ratio between stalk rolls 209A, 209B and thereby achieve the desired quality of processing of stalks 215. Control system 118 is configured for controlling the angular velocities of stalk rolls 209A, 209B.

Control system 118 includes controller 319 (which can be referred to as a controller system 319), input/output device 125, angular velocity sensors 326A, 326B, chop quality sensor(s) 327, and actuators 328A, 328B, each of which is operatively coupled with one another and with frames 101, 114 (this is one exemplary embodiment of control system 118, though any or all components 326A, 326B, 327, 328A, 328B can be omitted). Regarding actuators 328A, 328B first, actuators 328A, 328B can be any suitable actuator configured for receiving a respective adjustment signal from controller 319 (i.e., a first angular velocity adjustment signal, a second angular velocity adjustment signal), and thereby for adjusting the angular velocity of stalk rolls 209A, 209B. More specifically, actuator 328A can adjust, for instance, a gearbox. Actuator 328B can adjust device 330. Regarding controller 319, controller 319 is operatively coupled with harvester frame 101.

In general, controller 319 may correspond to any suitable processor-based device(s), such as a computing device or any combination of computing devices. Controller 319 may generally include one or more processor(s) 321 and associated memory 322 configured to perform a variety of computer-implemented functions (e.g., performing the methods, steps, algorithms, calculations and the like disclosed herein). Thus, controller 319 may include a processor 321 therein, as well as associated memory 322, data 323, and instructions 324, each forming at least part of the controller 319. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 322 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 322 may generally be configured to store information accessible to the processor(s) 321, including data 323 that can be retrieved, manipulated, created, and/or stored by the processor(s) 321 and the instructions 324 that can be executed by the processor(s) 321. In some embodiments, data 323 may be stored in one or more databases.

Further, controller 319 can communicate with input/output device 125, angular velocity sensors 326A, 326B, one or more chop quality sensors 327, and actuators 328A, 328B in any suitable way, such as a wired connection or a wireless connection, such as radio signals (RF), light signals, cellular, WiFi, Bluetooth, Internet, via cloud-based devices such as servers, and/or the like. Further, while not shown, controller 319 can communicate with a remotely located data center (which can also be a part of control system 118), which controller 319 can communicate with by any suitable way, such as a wired connection or a wireless connection, such as radio signals (RF), light signals, cellular, WiFi, Bluetooth, Internet, via cloud-based devices such as servers, and/or the like. Such a data center can include its own controller (and thus processor(s), memory, data, and instructions, substantially similar to that described above with respect to controller 319) which can be configured to perform any of the functions associated with controller 319. Controller 319 and the data center can be a part of any network facilitating such communication therebetween, such as a local area network, a metropolitan area network, a wide area network, a neural network, whether wired or wireless.

Regarding device 125, operator can input certain settings with respect to stalk rolls 209A, 209B by way of device 125, and device 125 can display information to operator concerning the angular velocities of stalk rolls 209A, 209B. For instance, operator can input the desired angular velocity of stalk roll 209A and/or 209B, and can further input, for example, a desired angular velocity ratio between stalk rolls 209A, 209B. Further, based on what is sensed by sensors 326A, 326B, device 125 can display the sensed angular velocities of rolls stalk rolls 209A, 209B, upon which operator can input adjustments to the angular velocities of stalk rolls 209A, 209B by way of device 125.

Angular velocity sensor 326A is assigned to stalk roll 209A, and angular velocity sensor 326B is assigned to stalk roll 209B. Sensor 326A is configured for: sensing the first angular velocity (of the stalk roll 209A); and outputting a first angular velocity signal corresponding to the first angular velocity. Sensor 326B is configured for: sensing the second angular velocity (of the stalk roll 209B); and outputting, to controller 319, a second angular velocity signal corresponding to the second angular velocity. Sensor 326A, 326B can be any suitable type of sensor configured for sensing such angular velocities and can be positioned in any suitable location at or near the respective stalk rolls 209A, 209B.

Controller 319 is configured for adjusting the angular velocities of stalk rolls 209A, 209B. Controller 319 is configured for: determining a first angular velocity adjustment and/or a second angular velocity adjustment based at least in part on the first angular velocity signal and/or the second angular velocity signal; outputting the first angular velocity adjustment signal to actuator 328A and/or the second angular velocity adjustment signal, based at least in part on the first angular velocity signal and/or the second angular velocity signal. That is, controller 319, based on settings by the operator, has desired (or targeted) first and/or second angular velocities and/or a desired ratio between first and second angular velocities, and controller 319 compares the actual first and second angular velocities (that is, the first and second angular velocities sensed by sensors 326A, 326B) to the desired first and second angular velocities and/or the desired ratio between first and second angular velocities, in order to make the adjustments to come in line with the desired first and second angular velocities and/or the desired ratio. Further, depending upon the result of the comparison made by controller 319, controller can output first and second angular velocity signals to actuators 328A, 328B in order to adjust the angular velocities of stalk roll 209A and/or 209B.

Further, the operator can make the settings of the first and/or second angular velocities and/or the ratio between the first and second angular velocities based upon a variety of factors. These factors can include a crop material variety, a crop material population, a health of the crop material, a moisture of the crop material, and/or a respective field. Further, operator make new settings regarding the first and/or second angular velocities and/or the ratio between the first and second angular velocities, when the operator observes the chop quality performed by stalk rolls 209A, 209B. That is, operator can monitor the length pf the stalk segments and/or the degree of destruction of the stalk segments (i.e., the extent of the axial shredding of the stalk segments). For instance, the operator may determine that an insufficient amount of axial shredding is occurring and, as a result, input a setting into device 125 that thereby increases the ratio between the first and second angular velocities.

Further, control system 118 may optionally include one or more chop quality sensors 327, as indicated. Sensors 327 can be in the alternative or in addition to the operator made judgments about chop quality. Assuming that control system 118 includes one or more chop quality sensors 327 (which are addressed in the singular, though a plurality can be included), chop quality sensor 327 adds the dimension of control system 118 being able to automatically adjust the first and/or second angular velocities and/or the ratio between first and second angular velocities. Sensor 327 can be any suitable sensor, such as a visual sensor, such as a camera, a lidar sensor, and/or a radar sensor (which can be deemed to be a kind of visual sensor herein). Further, in order to monitor the chop quality of stalk rolls 209A, 209B, sensor 327 can be coupled with frame 101 or 114 and can be placed anywhere on combine 100 after the row units 206 and before residue is output from the combine 100, such as before rear wheels 103, so as to be able to observe the stalk segments processed by stalk rolls 209A, 209B.

Sensors 327 are configured for: sensing at least one chop quality characteristic of stalk 215 after stalk rolls 209A, 209B have processed stalk 315; and outputting, to controller 319, a chop quality characteristic signal corresponding to the at least one chop quality characteristic. The chop quality characteristic can include a length of a stalk segment after stalk rolls 209A, 209B have laterally severed stalk 215 into various shorter segments. For instance, sensors 327 may sense that a respective segment is four inches long. Controller 319 can receive this data concerning length and average the length of the stalk segments sensed. Controller 319 can output this average to device 125 for operator to see and thereby optionally to adjust the first and/or second angular velocity and/or the angular velocity ratio between stalk rolls 209A, 209B. Alternatively or in addition thereto, after controller 319 calculates the average length of stalk segments, controller 319 can compare the actual average of the lengths of the stalk segments to a desired length of stalk segments (this desired length can be input by operator into device 125). Based at least in part on this, controller 319 can output a signal to actuator 328A and/or 328B so as to adjust the angular velocities of stalk roll 209A and/or 209B and/or the actual ratio between the first and second angular velocities. Alternatively or in addition thereto, the chop quality characteristic can include a degree of destruction of the stalk segments, that is, the extent of axial shredding. Controller 319 can be configured for receiving this data concerning extent of axial shredding, comparing this data to a reference standard stored by controller 319 reflecting an ideal extent of axial shredding (such a reference standard can be input by way of various parameters or dimensions and/or by way of a photograph of an ideal sample of an axially shredded stalk segment uploaded into controller 319), and output a signal to actuator 328A and/or 328B so as to adjust the angular velocities of stalk roll 209A and/or 209B and/or the actual ratio between the first and second angular velocities. For instance, if an insufficient extent of axial shredding is occurring, controller 319 can increase the different in angular velocity between stalk rolls 209A, 209B in order to obtain more axial shredding.

Figure 4:
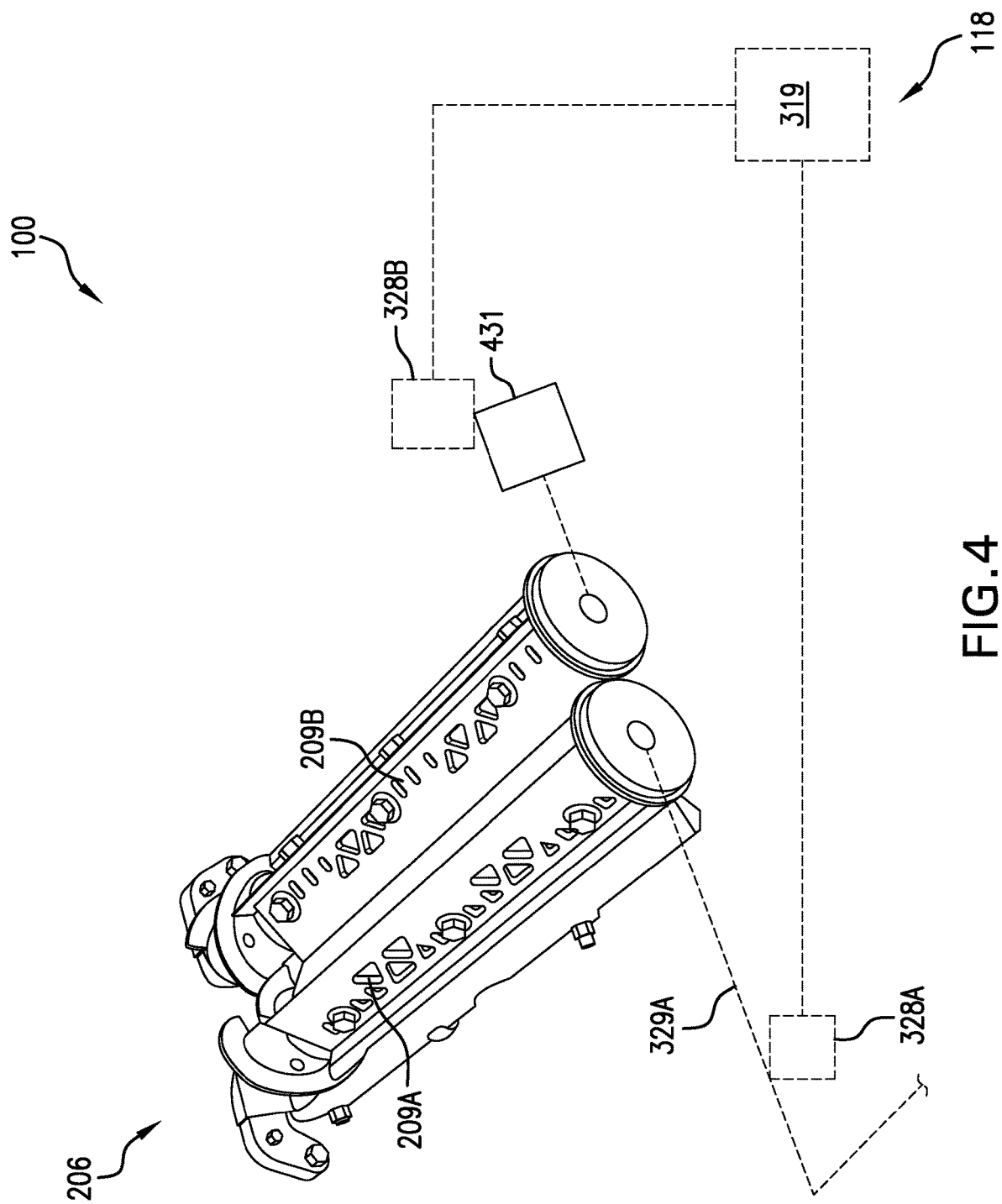
FIG. 4 illustrates a perspective view of another embodiment of the agricultural harvester of FIG. 1, with portions broken away, including a single driveline and a motor, and the control system of FIG. 1 (shown schematically in side view), in accordance with an exemplary embodiment of the present invention.

Referring now to FIG. 4, there is shown schematically a perspective view of another embodiment of harvester 100, with portions broken away. More specifically, shown are two stalk rolls 209A, 209B of a respective row unit 206 (the rear of stalk rolls 209 being in the foreground of FIG. 3). The embodiment of harvester 100 shown in FIG. 4 is substantially similar to harvester shown in FIG. 3, except as shown or described. The primary difference between the embodiments shown in FIGS. 3 and 4 concerns the manner in which stalk roll 209B is driven. That is, stalk roll 209A is driven substantially similarly to what is described above. Thus, driveline 329A is employed. However, stalk roll 209B (the stalk roll 209 that can be different from and variable relative to stalk roll 209A) can be powered by an independent motor 431, such as an electrical motor or a hydraulic motor. Similar to above, motor 431 can be actuated by actuator 328B. The operation of control system 118 functions substantially similar to what is described above.

In use, an operator of combine 100 can make various initial settings via device 125. Such initial settings can include the first and/or second angular velocities, the ratio between the first and second angular velocities, the length of the stalk segments after processing by stalk rolls 209A, 209B, and/or the extent of destruction (i.e., axial shredding) of the stalk segments. As operator operates combine 100 and stalk rolls 209A process stalks 215, controller 319 can monitor angular velocities of rolls 209A, 209B and their angular velocity ratio by way of sensors 326A, 326B, making adjustments to the extent that these angular velocities and/or ratio depart from predetermined thresholds. Further, as operator observes the stalk segments that have been processed by stalk rolls 209A, 209B, operator may input new settings via device 125, to further refine the processing by stalk rolls 209A, 209B. Alternatively or in addition thereto, controller 319 may monitor the chop quality of stalk segments, detecting at least one chop quality characteristic, such as the length of the stalk segment and/or the extent of destruction (i.e., axial shredding), making adjustments to the extent that the sensed lengths and/or destruction depart from predetermined thresholds.

Figure 5:
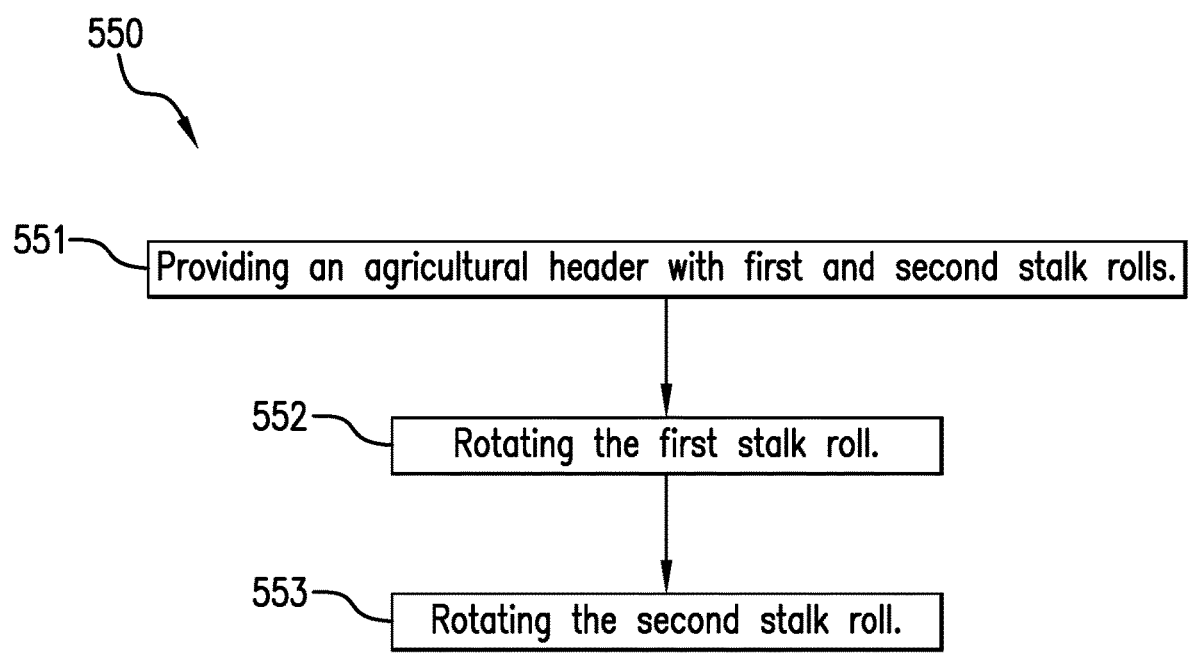
FIG. 5 illustrates a flow diagram showing a method of using an agricultural harvester, in accordance with an exemplary embodiment of the present invention.

Referring now to FIG. 5, there is shown a flow diagram of a method 550 of using an agricultural harvester 100, the method 550 including the steps of: providing 551 that the agricultural harvester 100 includes a harvester frame 101 and an agricultural header 110 coupled with the harvester frame 101, the agricultural header 110 including a header frame 114 and at least one row unit 106 including a first stalk roll 209A and a second stalk roll 209B; rotating 552 the first stalk roll 209A at a first angular velocity; and rotating 553 the second stalk roll 209B at a second angular velocity which is different from and variable relative to the first angular velocity. The agricultural harvester 100 further includes a driveline device 330 configured for varying the second angular velocity, wherein the driveline device 330 is a continuously variable transmission 330, a hydraulic transmission 330, an electric motor 431, or a hydraulic motor 431. The agricultural header 100 includes a first driveline 329A and a second driveline 329B, the first driveline 329A being associated with the first stalk roll 209A, the second driveline 329B being associated with the second stalk roll 209B and including the driveline device 330. The agricultural harvester 100 further includes a control system 118 operatively coupled with the harvester frame 101 and the header frame 114, the control system 118 configured for controlling the first angular velocity and the second angular velocity. The control system 118 includes: a first sensor 326B configured for: sensing the second angular velocity; and outputting a second angular velocity signal corresponding to the second angular velocity; and a controller system 319 configured for: determining an adjustment of the second angular velocity based at least in part on the second angular velocity signal.

It is to be understood that the steps of method 550 are performed by controller 319 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 319 described herein, such as the method 550, is implemented in software code or instructions which are tangibly stored on a tangible computer readable medium. The controller 319 loads the software code or instructions via a direct interface with the computer readable medium or via a wired and/or wireless network. Upon loading and executing such software code or instructions by controller 319, controller 319 may perform any of the functionality of controller 319 described herein, including any steps of the method 550.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural harvester, comprising:
   a harvester frame;
   an engine; and
   an agricultural header coupled with the harvester frame, the agricultural header including:
   a header frame;
   a driveline coupled to the engine;
   an independent electrical motor; and
   at least one row unit including a first stalk roll and a second stalk roll, the first stalk roll configured to be driven by the driveline coupled to the engine and for rotating at a first angular velocity, the second stalk roll configured to be driven by the independent electrical motor and for rotating at a second angular velocity which is different from and variable relative to the first angular velocity.

2. The agricultural harvester of claim 1, wherein the driveline device is configured for varying the second angular velocity.

3. The agricultural harvester of claim 2, further comprising a control system operatively coupled with the harvester frame and the header frame, the control system configured for controlling the first angular velocity and the second angular velocity.

4. The agricultural harvester of claim 3, wherein the control system includes:
- a first sensor configured for:
  - sensing the second angular velocity;
  - outputting a second angular velocity signal corresponding to the second angular velocity; and
- a controller system configured for:
  - determining an adjustment of the second angular velocity based at least in part on the second angular velocity signal.

5. An agricultural header of an agricultural harvester, the agricultural harvester including a harvester frame and an engine, the agricultural harvester being coupled with the harvester frame, the agricultural header comprising:
- a header frame;
- a driveline configured for coupling to the engine;
- an independent electrical motor; and
- at least one row unit including a first stalk roll and a second stalk roll, the first stalk roll configured to be driven by the driveline coupled to the engine and for rotating at a first angular velocity, the second stalk roll configured to be driven by the independent electrical motor and for rotating at a second angular velocity which is different from and variable relative to the first angular velocity.

6. The agricultural header of claim 5, wherein the driveline device of the agricultural harvester is configured for varying the second angular velocity.

7. The agricultural header of claim 6, wherein the agricultural header includes at least in part a control system of the agricultural harvester which is operatively coupled with the harvester frame and the header frame, the control system configured for controlling the first angular velocity and the second angular velocity.

8. The agricultural header of claim 7, wherein the control system includes:
- a first sensor configured for:
  - sensing the second angular velocity;
  - outputting a second angular velocity signal corresponding to the second angular velocity; and
- a controller system configured for:
  - determining an adjustment of the second angular velocity based at least in part on the second angular velocity signal.

9. A method of using an agricultural harvester, the method comprising the steps of:
- providing the agricultural harvester, the agricultural harvester including a harvester frame, an engine, and an agricultural header coupled with the harvester frame, the agricultural header including a header frame, a driveline coupled to the engine, an independent electrical motor, and at least one row unit including a first stalk roll and a second stalk roll;
- rotating the first stalk roll at a first angular velocity, wherein the first stalk roll is driven by the driveline coupled to the engine; and
- rotating the second stalk roll at a second angular velocity which is different from and variable relative to the first angular velocity, wherein the second stalk roll is driven by the independent electrical motor.

10. The method of claim 9, wherein the driveline device is configured for varying the second angular velocity.

11. The method of claim 10, wherein the agricultural harvester further comprises a control system operatively coupled with the harvester frame and the header frame, the control system configured for controlling the first angular velocity and the second angular velocity.

12. The method of claim 11, wherein the control system includes:
- a first sensor configured for:
  - sensing the second angular velocity;
  - outputting a second angular velocity signal corresponding to the second angular velocity; and
- a controller system configured for:
  - determining an adjustment of the second angular velocity based at least in part on the second angular velocity signal.

* * * * *